United States Patent
Okahata et al.

(10) Patent No.: US 9,023,480 B2
(45) Date of Patent: May 5, 2015

(54) GLASS SUBSTRATE FOR CHEMICAL STRENGTHENING, AND METHOD FOR PRODUCING SAME

(71) Applicant: Asahi Glass Company, Limited, Chiyoda-ku (JP)

(72) Inventors: Naoki Okahata, Tokyo (JP); Koji Nakagawa, Tokyo (JP); Yuichi Kuwahara, Tokyo (JP); Daisuke Kobayashi, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/309,073

(22) Filed: Jun. 19, 2014

(65) Prior Publication Data

US 2014/0302330 A1     Oct. 9, 2014

Related U.S. Application Data

(63) Continuation of application No. PCT/JP2012/082108, filed on Dec. 11, 2012.

(30) Foreign Application Priority Data

Dec. 19, 2011   (JP) .................. 2011-277203

(51) Int. Cl.
  *B32B 17/06*   (2006.01)
  *C03C 17/245*  (2006.01)
  *C03C 21/00*   (2006.01)
  *C03C 17/25*   (2006.01)

(52) U.S. Cl.
  CPC .............. *C03C 17/245* (2013.01); *C03C 21/00* (2013.01); *C03C 17/25* (2013.01)

(58) Field of Classification Search
  USPC ......... 428/410, 688, 689, 701, 702, 426, 432, 428/428
  See application file for complete search history.

(56) References Cited

U.S. PATENT DOCUMENTS

| | | | | |
|---|---|---|---|---|
| 5,279,851 | A  * | 1/1994 | Minosou et al. | ........... 427/126.2 |
| 2005/0153072 | A1* | 7/2005 | Otani et al. | ................ 427/248.1 |
| 2006/0115651 | A1* | 6/2006 | Merfeld et al. | ............... 428/410 |
| 2011/0062436 | A1* | 3/2011 | Yamazaki et al. | .............. 257/43 |
| 2011/0068335 | A1* | 3/2011 | Yamazaki et al. | .............. 257/43 |

(Continued)

FOREIGN PATENT DOCUMENTS

| | | |
|---|---|---|
| JP | 58-145642 | 8/1983 |
| JP | 4-310544 | 11/1992 |

(Continued)

OTHER PUBLICATIONS

International Search Report issued Mar. 26, 2013 in PCT/JP2012/082108 filed Dec. 11, 2012.
U.S. Appl. No. 14/313,315, filed Jun. 24, 2014, Okahata, et al.

*Primary Examiner* — David Sample
*Assistant Examiner* — Lauren Colgan
(74) *Attorney, Agent, or Firm* — Oblon, McClelland, Maier & Neustadt, L.L.P.

(57) ABSTRACT

A glass substrate for chemical strengthening is formed by a float process. The glass substrate includes at least one layer of a film formed of an inorganic material that contains H atoms in a concentration of $1.0\times10^{15}$ to $1.0\times10^{19}$ atom/mm$^3$. The at least one layer is formed on at least one surface of the glass substrate.

7 Claims, 2 Drawing Sheets

(56) References Cited

U.S. PATENT DOCUMENTS

| | | | |
|---|---|---|---|
| 2011/0293928 A1* | 12/2011 | Chu et al. | 428/336 |
| 2012/0196110 A1* | 8/2012 | Murata et al. | 428/220 |
| 2012/0198888 A1* | 8/2012 | Hasegawa et al. | 65/17.2 |
| 2014/0102144 A1* | 4/2014 | Yamanaka et al. | 65/30.14 |
| 2014/0127474 A1* | 5/2014 | Chu et al. | 428/174 |
| 2014/0302330 A1* | 10/2014 | Okahata et al. | 428/432 |
| 2014/0305165 A1* | 10/2014 | Okahata et al. | 65/30.14 |

FOREIGN PATENT DOCUMENTS

| | | |
|---|---|---|
| JP | 2002-234754 | 8/2002 |
| JP | 2011-88765 | 5/2011 |
| WO | 2008/004481 | 1/2008 |
| WO | 2011/049030 | 4/2011 |

* cited by examiner

GLASS SUBSTRATE FOR CHEMICAL STRENGTHENING, AND METHOD FOR PRODUCING SAME

TECHNICAL FIELD

The present invention relates to a glass substrate for chemical strengthening, and a method for producing the same.

BACKGROUND ART

Glass that has been subjected to a chemical strengthening process such as ion exchange (hereinafter, such glass will also be referred to as "chemically strengthened glass") has been used as a cover glass of display devices such as digital cameras, cell phones, and PDAs (Personal Digital Assistants), and as a glass substrate of displays. Since the chemically strengthened glass has higher mechanical strength than the case of unstrengthened glass, the chemically strengthened glass is preferable for use in these applications.

The chemical strengthening process by an ion-exchange is a process by which the metal ions (for example, Na ions) having a smaller radius contained in glass are replaced by metal ions (for example K ions) having a larger radius contained in the glass to generate a compressive stress layer on a glass surface, and improve the glass strength.

On the other hand, chemically strengthened glass is sometimes required to have functions such as reflection prevention, photoabsorption, and transparent conductivity, and these functions are particularly desired in the cover glass and display.

Such functions can be given to glass by forming a functional film on a glass substrate surface. As the method of forming such a functional film, a sol-gel method, in which a coating liquid containing fine particles is applied to a glass substrate, followed by drying and calcining to thereby perform gelling, thereby forming a functional film, is known (Patent Documents 1 and 2).

For chemical strengthening of a glass substrate by an ion-exchange, wherein a functional film has been formed on the surface of the glass substrate, the functional film is necessary to have channels for passage of Na ions, K ions and the like, and thus, the functional film needs to be porous intentionally for this purpose. In Patent Documents 1 and 2, the functional film is made porous by containing hollow particles in the functional film, by using the sol-gel method.

Patent Document 1 discloses a method for producing a chemically strengthened glass article, in which a coating liquid containing inorganic fine particles and a hydrolytic metallic compound is applied onto at least one surface of a glass substrate, followed by hearing to form a functional film covering the glass substrate surface, and then, subjecting to chemical strengthening.

Patent Document 2 discloses a method for producing antireflective strengthened glass, in which an antireflective film containing a hydrolytic condensation product of a silicon compound, a silica sol having inner cavities, and a metal chelate compound is formed on a surface of a glass substrate, and the glass substrate with the antireflective film is subjected to chemical strengthening process based on an ion-exchange.

CITATION LIST

Patent Documents

Patent Document 1: JP-A-2002-234754
Patent Document 2: JP-A-2011-88765

SUMMARY OF INVENTION

Technical Problem

In a chemical strengthening process after a functional film has been formed on a glass substrate surface by using the sol-gel method as described in Patent Documents 1 and 2, a void needs to be provided in the calcined film, and uniform hollow particles of a narrow particle size distribution need to be mixed for this purpose. However, such material is not available at low cost.

In the case of forming a hollow particle-containing functional film on a glass substrate surface by using the sol-gel method, the hollow particles need to be uniformly dispersed in a liquid. However, the particles dispersed in the liquid aggregate after a long period of time from the preparation of the liquid. Thus, handling of the material is difficult.

An object of the present invention is to provide a glass substrate for chemical strengthening in which a film capable of being subjected to a chemical strengthening process after the formation of the film is formed on a glass substrate surface without providing a physical void space by using particles or the like, even though the film is dense.

Solution to Problem

The present inventors found a way of chemically strengthening a glass substrate after forming a dense film containing H atoms in a specific concentration on the glass substrate without providing a physical void space by incorporating hollow particles in the functional film. The present invention was completed on the basis of this finding.

That is, the present invention is as follows.

1. A glass substrate for chemical strengthening, formed by a float process, comprising at least one layer of a film formed of an inorganic material that contains H atoms in a concentration of $1.0 \times 10^{15}$ to $1.0 \times 10^{19}$ atom/mm$^3$, the at least one layer being formed on at least one surface of the glass substrate.
2. The glass substrate for chemical strengthening according to the above 1, wherein the film formed of the inorganic material is an alkali-free oxide.
3. The glass substrate for chemical strengthening according to the above 2, wherein the alkali-free oxide includes at least one of an oxide and a composite oxide, the oxide and composite oxide include at least one element selected from the group consisting of silicon, titanium, tin, aluminum, zinc, chromium, copper, manganese, iron, cobalt, nickel, zirconium, silver, niobium, molybdenum, antimony, and indium.
4. The glass substrate for chemical strengthening according to any one of the above 1 to 3, wherein the film formed of the inorganic material is a film formed by an atmospheric pressure CVD method.
5. A glass substrate obtained by subjecting the glass substrate for chemical strengthening according to any one of the above 1 to 4 to a chemical strengthening process.
6. A method for producing a glass substrate for chemical strengthening, the method comprising forming at least one layer of a film formed of an inorganic material that contains H atoms in a concentration of $1.0 \times 10^{15}$ to $1.0 \times 10^{19}$ atom/mm$^3$ on at least one surface of a glass substrate formed by a float process.
7. The method for producing a glass substrate for chemical strengthening according to the above 6, wherein the film formed of the inorganic material that contains H atoms in a concentration of $1.0 \times 10^{15}$ to $1.0 \times 10^{19}$ atom/mm$^3$ is formed by an atmospheric pressure CVD method.

Advantageous Effects of Invention

In the glass substrate for chemical strengthening according to the present invention, a film formed of an inorganic material that contains H atoms is formed on at least one surface of the glass substrate, and the H atoms contained in the film alter the chemical structure in the film, thereby forming ion channels. Because of this, chemical strengthening process can be performed after the film has been formed on the glass substrate.

In the glass substrate for chemical strengthening according to the present invention, the extent of the warpage of the glass substrate after chemical strengthening can be reduced by adjusting the H atom content in the film formed of the inorganic material containing H atoms, the film formed on at least one surface of the glass substrate, without performing processes such as grinding and polishing before the chemical strengthening process.

In the glass substrate for chemical strengthening according to the present invention, the film formed of the inorganic material containing H atoms in a concentration of $1.0 \times 10^{15}$ to $1.0 \times 10^{19}$ atom/mm$^3$ can be formed on the glass substrate by using a film-formation method such as an atmospheric pressure CVD method or a sol-gel method.

In the case of the atmospheric pressure CVD, the film formed of the inorganic material containing H atoms in a concentration of $1.0 \times 10^{15}$ to $1.0 \times 10^{19}$ atom/mm$^3$ can be formed on a large-area glass substrate, and the glass substrate can be cut into the desired size after forming the film, i.e., before chemical strengthening, and thus, the productivity thereof is high.

The film-formation method such as the atmospheric pressure CVD method may be applied to a float line, and the film may be formed in the bath or in the subsequent annealing zone. In this way, the need to reheat the glass substrate can be eliminated, and an industrial process with small environmental load and high productivity can be provided.

From the standpoint of the sol-gel method, the coating liquid does not require the particles conventionally needed to provide a physical void space, and thus it can be provided at low cost. Further, because a technique of dispersing such particles in the coating liquid is not required, the coating liquid can be easily produced at low cost. This is advantageous in terms of both productivity and cost.

In the glass substrate for chemical strengthening according to the present invention, the functional film can be formed on a surface of the glass substrate that will be chemically strengthened glass, before chemically strengthening or shaping the glass substrate. It is therefore possible to produce a chemically strengthened glass product that has the functional film formed on the glass substrate surface with high productivity at low cost, by using the glass substrate for chemical strengthening according to the present invention.

DESCRIPTION OF EMBODIMENTS

Figure 1:
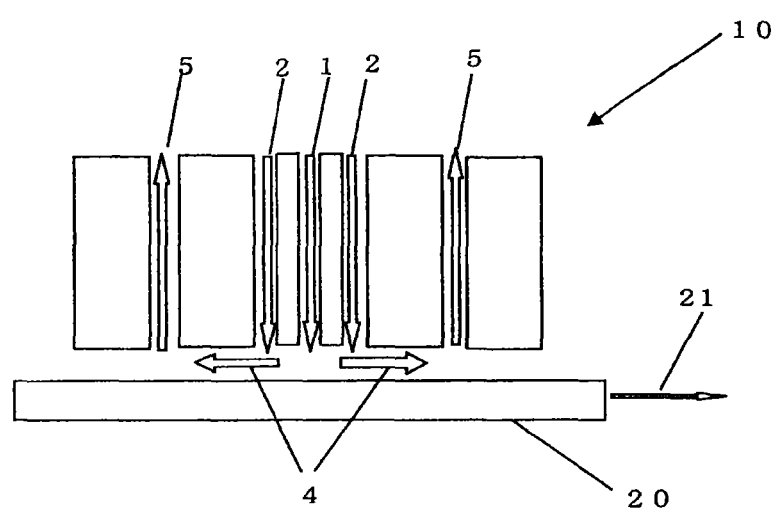
FIG. 1 is a schematic diagram of an apparatus used in Example.

The present invention is described below in detail.
<Glass Substrate>

As the glass substrate according to the present invention, a glass substrate having various compositions can be used, provided that the glass substrate is formed by the float process, and that the compositions are capable of being subjected to strengthening by a chemical strengthening process.

Specific examples thereof include colorless transparent soda-lime silicate glass, alumino silicate glass, borate glass, lithium alumino silicate glass, borosilicate glass, and alkali-free glass, and transparent glass plates formed of various other kinds of glass.

Among them, glass containing alkali metal ions or alkali earth metal ions, that have smaller ion radius, is preferred, and glass containing Na ions is more preferred. A glass substrate containing Na ions easily is capable of being subjected to ion replacement with metal ions having relatively small ion radius among metal ions having ion radius larger than Na, for example K ions. The Na ions can thus be more effectively replaced to thereby strengthen the glass, even when the glass substrate has a functional film formed on a surface thereof.

The thickness of the glass substrate is not particularly limited. Generally, the thickness of the glass substrate is preferably 5 mm or less, more preferably 3 mm or less for performing an effective chemical strengthening process which will be described later.

The composition of the glass substrate for chemical strengthening according to the present invention is not particularly limited. For example, the following glass compositions may be used.

(i) Glass composition containing, in mol %, 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO, and 0 to 5% of $ZrO_2$.

(ii) Glass composition containing, in mol %, 50 to 74% of $SiO_2$, 1 to 10% of $Al_2O_3$, 6 to 14% of $Na_2O$, 3 to 11% of $K_2O$, 2 to 15% of MgO, 0 to 6% of CaO, and 0 to 5% of $ZrO_2$, in which the total content of $SiO_2$ and $Al_2O_3$ is 75% or less, the total content of $Na_2O$ and $K_2O$ is 12 to 25%, and the total content of MgO and CaO is 7 to 15%.

(iii) Glass composition containing, in mol %, 68 to 80% of $SiO_2$, 4 to 10% of $Al_2O_3$, 5 to 15% of $Na_2O$, 0 to 1% of $K_2O$, 4 to 15% of MgO, and 0 to 1% of $ZrO_2$.

(iv) Glass composition containing, in mol %, 67 to 75% of $SiO_2$, 0 to 4% of $Al_2O_3$, 7 to 15% of $Na_2O$, 1 to 9% of $K_2O$, 6 to 14% of MgO, and 0 to 1.5% of $ZrO_2$, in which the total content of $SiO_2$ and $Al_2O_3$ is 71 to 75%, the total content of $Na_2O$ and $K_2O$ is 12 to 20%, and when CaO is contained, the content thereof is less than 1%.

<Film Formed of Inorganic Material>

In the glass substrate for chemical strengthening according to the present invention, a film formed of an inorganic material containing H atoms in a concentration of $1.0 \times 10^{15}$ to $1.0 \times 10^{19}$ atom/mm$^3$ is formed on at least one surface of the glass substrate. The film formed of the inorganic material is typically an oxide film, a nitride film, a fluoride film, a metal film, or a laminated film of these.

Non-limiting examples of the oxides include alkali-free oxides such as $TiO_2$ and $SiO_2$, alkali element- or alkali earth element-containing composite oxides such as $LiMnO_4$ and $BaTiO_3$, and alkali oxides such as $K_2O$ and $Na_2O$.

Non-limiting examples of the nitrides include $Si_3N_4$, MN, and BN.

Non-limiting examples of the fluoride film include $MgF_2$, $CaF_2$, $SrF_2$, and $BaF_2$.

Non-limiting examples of the metals include Ag and Cu.

The alkali-free oxide refers to oxides of elements other than alkali metal elements, specifically oxides and composite oxides, that contain one or more elements other than alkali metals, mixed oxides of two or more of the oxides and composite oxides, and laminates of the oxides and composite oxides.

The alkali-free oxide is preferably an oxide that includes at least one of oxides and composite oxides, wherein the oxides and composite oxides include at least one element selected from the group consisting of silicon, titanium, tin, aluminum, zinc, chromium, copper, manganese, iron, cobalt, nickel, zirconium, silver, niobium, molybdenum, antimony, and indium.

The film may be formed only of oxides, or may contain other compounds such as nitrides, fluorides, and sulfides, and may be combined with any element. Further, the film may be doped with small amounts of lanthanoid elements or actinoid elements.

Non-limiting examples of the alkali element-containing composite oxides include $LiMnO_4$ and $BaTiO_3$.

The content of the inorganic material in the film formed of the inorganic material is preferably 50 mass % or more, and more preferably 70 mass % or more. In the case where the content of the inorganic material in the film formed of the inorganic material is 50 mass % or more, the chemical strengthening can be evenly performed.

The film formed of the inorganic material containing H atoms in a concentration of $1.0 \times 10^{15}$ to $1.0 \times 10^{19}$ atom/mm$^3$ may be formed on only one of the surfaces of the glass substrate for chemical strengthening, or may be formed on the both surfaces. Generally, the film of the inorganic material covers preferably at least 50%, and more preferably at least 70% of the glass substrate surface.

Generally, the thickness of the film formed of the inorganic material film is preferably 5 to 600 nm, and more preferably 10 to 400 nm. In the case where the thickness thereof is 5 to 600 nm, the chemical strengthening can be evenly performed.

The H atom content in the inorganic material falls within a H atom concentration range of preferably $1.0 \times 10^{15}$ to $1.0 \times 10^{19}$ atom/mm$^3$, and more preferably 0.05 to 5 atom %. In the case where the H atom concentration in the inorganic material is $1.0 \times 10^{15}$ to $1.0 \times 10^{19}$ atom/mm$^3$, ions can be more easily replaced in chemical strengthening, and the dense film can be maintained. The H atom concentration in the inorganic material may be measured by secondary ion mass spectrometry.

In the glass substrate for chemical strengthening according to the present invention, the film formed of the inorganic material is formed on at least one surface of the glass substrate, and the H atoms contained in the inorganic material alter the chemical structure in the film, thereby forming ion channels. Because of this, the chemical strengthening process can be performed after the film has been formed on the glass substrate.

Furthermore, the present invention also can solve the problematic warpage of chemically strengthened float glass and resultant loss of flatness thereof. The warpage occurs when the degree of chemical strengthening on the glass surface (top surface) not in contact with the molten tin during forming by a float process is different from that on the glass surface (bottom surface) in contact with the molten metal (usually, tin).

Warpage of the chemically strengthened glass is believed to be due to the incorporation of the molten tin into the glass surface (bottom surface) in contact with the molten tin during glass forming by float process. Because the degree of chemical strengthening is small on the bottom surface as compared with the case on the top surface, the compressive stress due to the chemical strengthening is larger on the top surface, resulting in the warpage of glass so as to form convex toward the top surface side. This has been counteracted by reducing the strengthening stress, or by applying a chemical strengthening process after grinding and polishing the bottom surface.

In the glass substrate for chemical strengthening according to the present invention, the content of the H atoms in the inorganic material contained in the film formed on the glass substrate is adjusted to thereby adjust the diffusion rate of ions on the top surface and the bottom surface, so that the degree of chemical strengthening can be balanced between the top surface and the bottom surface. According to the glass substrate for chemical strengthening according to the present invention, the warpage of the glass substrate after a chemical strengthening process can be reduced without taking measures such as reducing the strengthening stress, or grinding and polishing the glass substrate before the chemical strengthening process.

For reducing the warpage of the glass substrate after the chemical strengthening process in the glass substrate for chemical strengthening according to the present invention, it is preferable to form the film formed of the inorganic material on the top surface or the bottom surface, whichever is higher degree of chemical strengthening, generally the top surface.

The film formed of the inorganic material may be formed on both of the top surface and the bottom surface. In this case, the warpage of the glass substrate after the chemical strengthening process can be reduced by adjusting the H atom contents in the inorganic material or thicknesses, in the film on the top surface side and in the film on the bottom surface side.

<Method for Forming Film Formed of Inorganic Material>

As the method for forming the film formed of the inorganic material, examples thereof include CVD (chemical vapor deposition) methods (such as an atmospheric pressure CVD method and a plasma CVD method), a sputtering method, a wet coating method, and a vapor deposition method. Among them, the CVD method is preferred, and the atmospheric pressure CVD method is more preferred, because these methods allow for easy deposition over a large area.

As a specific example thereof, the case of the formation of the film formed of the inorganic material on the glass substrate by a CVD method is described below with reference to the schematic diagram of FIG. 1.

With an injector 10 to be used for the atmospheric pressure CVD method, a gas containing an inorganic material source and an oxidizing agent is supplied to a glass substrate surface, and the inorganic material source and the oxidizing agent are reacted on the glass substrate surface, thereby obtaining a glass substrate having formed thereon a film formed of the inorganic material.

That is, a gas in which an inorganic material source in an amount of preferably 0.01 to 50 mass % at preferably 0.01 to 10 SLM and a carrier gas at preferably 1 to 1,000 SLM is mixed through a center slit 1 as shown in FIG. 1 is heated to preferably 10 to 200° C. An oxidizing agent at preferably 0.5 to 2,000 SLM, and a carrier gas at preferably 1 to 5,000 SLM are then blown thereon through outer slits 2 to thereby obtain a glass substrate having formed thereon preferably 5 to 600 nm of the inorganic material. The flow rate and temperature conditions are merely examples, and are not limited to these, as long as the inorganic material can be deposited in the desired amount. SLM stands for standard litter per minute.

The gas flows on/above a substrate 20 through a channel 4, and are discharged through discharge slits 5 preferably 1.0 to 20 times the amount of the total gas flow introduced into the injector. A hot-wire anemometer (for example, Climomaster 6543, manufactured by Kanomax) is used for measurements of gas temperature and flow rate.

The glass substrate is heated to preferably 300 to 700° C. The glass substrate temperature may be measured with an installed radiation thermometer, immediately before blowing the gas.

The inorganic material source is preferably an alkali-free source. The alkali-free source is preferably a silicon source, a titanium source, a tin source, or an indium source, but is not limited to these.

Non-limiting examples of the silicon source include $SiH_4$, $SiHCl_3$, $SiH_2Cl_2$, $SiH_3Cl$, $SiCl_4$, $Si(CH_3)_2Cl_2$, $SiBr_4$, $SiI_4$, $SiF_4$, and $Si(OC_2H_5)_4$.

Non-limiting examples of the titanium source include $Ti(OiPr)_4$, and $TiCl_4$.

Non-limiting examples of the tin source include $SnCl_4$, n-$C_4H_9SnCl_3$, tin acetate, $Sn(CH_3)_4$, and $(CH_3)_2SnCl_2$.

Non-limiting examples of the indium source include $InCl_3$, $InBr_3$, and $In(NO_3)_3$.

Non-limiting examples of the oxidizing agent include $O_2$, $O_3$, NO, $NO_2$, $N_2O$, CO, and $CO_2$.

The carrier gas is preferably a gas that does not react with the inorganic material source and the oxidizing agent at ordinary temperature. Examples thereof include $N_2$, air, $H_2$, $O_2$, Ne, Xe, $CO_2$, Ar, He, and Kr. These may be used either alone or in a combination of two or more. Among them, inert gas such as $N_2$ and Ar is preferable.

The film formed of the inorganic material may be a film having various functions. Non-limiting examples of such a functional film include a low reflective film, a heat-absorbing film, a heat-reflecting film, a UV absorbing film, a conductive film, and a glass burn prevention film. The same function(s) or different function(s) may be imparted to both of the surfaces of the glass substrate.

As a specific example of a method of imparting the same or different function(s) to both of the surfaces of the glass substrate, an inorganic material source and oxidizing agent, capable of imparting the same or different functional film(s) to each surface of both of the surfaces of the glass substrate are supplied in the annealing zone in the float process. In this way, a glass substrate having the same or different function(s) on both of the surfaces can be produced in a single process, without changing the glass composition. This method is very useful as a process with high productivity at low cost, because it enables the functional film(s) to be formed on the glass substrate in a single process, in addition to a common glass substrate producing method.

The glass substrate according to the present invention is formed by the float process, and can thus be generally transported with rollers. In the float process, the glass substrate is produced with a glass producing apparatus that includes a melting furnace that melts a glass raw material, a floating bath in which the molten glass is floated on molten metal (such as tin) to form a glass ribbon, and an annealing furnace that anneals the glass ribbon.

Thus, when the glass is formed on the molten metal (tin) bath, the inorganic material source and the oxidizing agent may be supplied to the glass substrate to be conveyed on the molten metal bath from the side not in contact with the metal surface, thereby forming the film formed of the inorganic material on the surface of the glass substrate.

The glass substrate is transported with rollers in the annealing zone located next to the molten metal (tin) bath. The annealing zone includes both the region of the annealing furnace and the region from the part in which the glass substrate is carried out of the molten metal (tin) bath in the floating bath to the part in which the conveyed glass substrate enters the annealing furnace. In the annealing zone, the inorganic material source and the oxidizing agent may be supplied from the top surface not in contact with the molten metal (tin), or from the bottom surface in contact with the molten metal (tin).

The glass substrate, the surface of which the film formed of the inorganic material has been formed, may be produced on line by using the glass producing technique based on the float process in combination with methods such as a CVD method, a spray method, a roll coating method and a flow coating method. In this case, the film formed of the inorganic material may be formed on the glass substrate by supplying a gas containing an inorganic material source and oxidizing agent from the surface not in contact with the molten metal (tin), or the surface (top surface) not in contact with the roller. The film formed of the inorganic material also may be formed on the glass substrate by appropriately supplying the liquid.

The float glass for chemical strengthening according to the present invention may have a multilayer structure in which a plurality of films having different properties is laminated on a glass substrate surface. As a specific method of forming such a multilayer structure in which a plurality of films having different properties is laminated on a glass substrate surface, for example, a $TiO_2$ film (first layer) is deposited on a glass substrate surface, a silica film (second layer) is deposited on the $TiO_2$ film, and a $SnO_2$ layer (third layer) is deposited on the silica film, thereby obtaining a multilayer transparent conductive oxide film.

<Chemical Strengthening Process>

The chemical strengthening process may be performed according to a conventional method. It is preferred that, before the chemical strengthening process, a shaping process according to the intended use, for example, such as cutting, end-surface machining, drilling, and other mechanical processes is performed.

In the chemical strengthening process, the glass substrate is contacted with a melt of metal salts (for example, potassium nitrate) containing metal ions having a large ion radius (typically, K ions) by immersing, and then, the metal ions having a small ion radius (typically, Na ions or Li ions) contained in the glass substrate is replaced with the metal ions having a large ion radius.

The chemical strengthening process may be performed, for example, by immersing the glass substrate in potassium nitrate solution at 300 to 550° C. for 5 minutes to 20 hours. As the conditions of the ion exchange, optimum condition may be selected by taking into consideration factors such as the viscosity characteristics of glass, use application, substrate thickness, and the tensile stress inside the glass.

Examples of the molten salts for performing the ion exchange process include potassium nitrate, and alkali sulfates and alkali chlorides, for example, such as sodium sulfate, potassium sulfate, sodium chloride, and potassium chloride. These molten salts may be used either alone or in combination.

The conditions of the chemical strengthening process are not particularly limited in the present invention, and optimum conditions may be selected by taking into consideration factors such as the glass properties and the molten salt.

By chemically strengthening the glass substrate for chemical strengthening according to the present invention, a chemically strengthened glass product that has the functional film on a surface of the chemically strengthened glass substrate can be obtained. Examples of such chemically strengthened glass products include cover glass of display devices such as digital cameras, cell phones, and PDAs, and glass substrate of the display.

EXAMPLES

The present invention is described below in greater detail using Examples. The present invention, however, is not limited to these.

(1) Production of Float Glass

A glass material having the following composition was used to produce a float glass sheet having a thickness of 0.8 mm, by the float process. The float glass sheet was used after being cut into 50×50 mm.

(Glass Material A)

Glass containing, in mol %, 64.3% of $SiO_2$, 8.0% of $Al_2O_3$, 12.5% of $Na_2O$, 4.0% of $K_2O$, 10.5% of MgO, 0.1% of CaO, 0.1% of SrO, 0.1% of BaO, and 0.5% of $ZrO_2$.

(2) Preparation of Glass Substrate for Chemical Strengthening

A gas containing monosilane ($SiH_4$) and oxygen ($O_2$) was supplied to a surface of the float glass sheet produced in the above (1), by using the injector 10 used for atmospheric pressure CVD in the manner shown in the schematic diagram of FIG. 1. The monosilane and the oxygen were reacted on the glass substrate surface, thereby obtaining a glass substrate on which a $SiO_2$ film had been formed.

That is, a gas in which 30% $SiH_4$ at 0.09 SLM and nitrogen ($N_2$) at 40.4 SLM were mixed through the center slit 1 as shown in FIG. 1 was heated to 150° C., and oxygen at 4.1 SLM and nitrogen at 36.5 SLM were blown thereon through the outer slits 2 at a flow rate of 72 cm/s, thereby obtaining the glass substrate having formed thereon a 32-nm $SiO_2$ film.

The gas was flown through the channel 4 on/above the substrate 20, and was discharged 2 times the amount of the total gas flow introduced into the injector thorough the discharge slits 5. A hot-wire anemometer (Climomaster 6543, manufactured by Kanomax) was used for measurements of gas temperature and flow rate.

Alumino soda glass (thickness 0.8 mm; Tg: 617° C.) available from Asahi Glass Co., Ltd. was used as the glass substrate. The glass substrate was heated to 580° C., and transported at a rate of 2 m/min. The glass substrate temperature was measured with an installed radiation thermometer, immediately before the gas was blown.

(3) Measurement of H Atomic Weight in Film Formed of Inorganic Material in Glass Substrate for Chemical Strengthening The H atomic weight in the film formed of the inorganic material ($SiO_2$) formed on the surface of the glass substrate for chemical strengthening obtained in the above (2) was measured by secondary ion mass spectrometry (SIMS). The average H atom concentration (atom/cc) in the $SiO_2$ film was determined from the SIMS profile of the $SiO_2$ film, and this concentration was regarded as a H atomic weight. The analysis conditions are as follows.

Apparatus: ADEPT 1010, manufactured by Ulvac-Phi Incorporated
Primary ion species: $Cs^+$
Primary ion acceleration voltage: 1 kV
Primary ion current value: 100 nA
Primary Ion Luster Size: 300×300 $\mu m^2$
Incident angle: 60 degrees A $H^+$-doped fused quartz produced under the following conditions was used as a quantitative standard sample.

Figure 2:
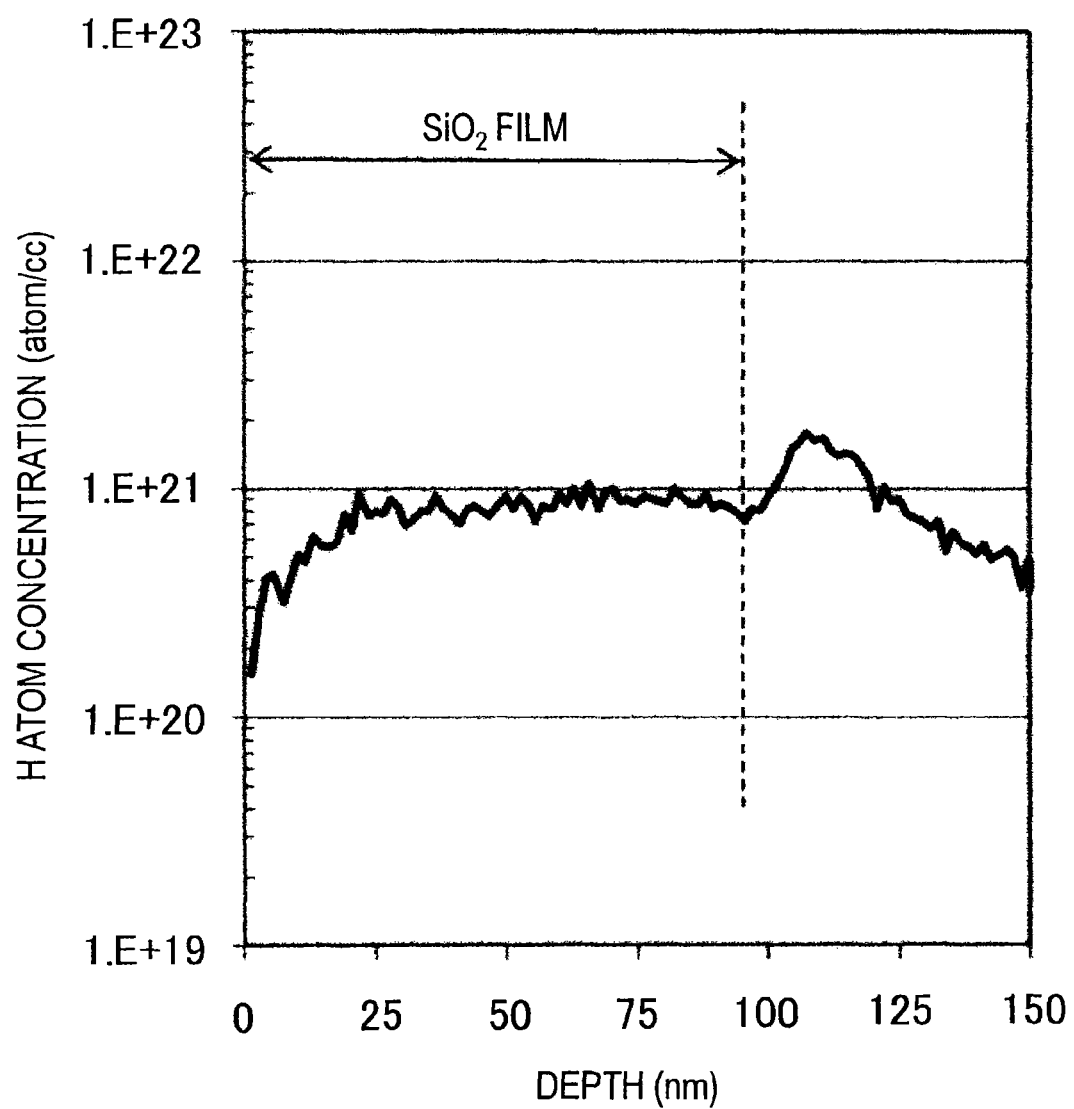
FIG. 2 represents the result of the measurement of average H atom concentration (atom/cc) in a $SiO_2$ film as determined from the SIMS profile of the $SiO_2$ film. For example, the notation 1E+23 means $1 \times 10^{+23}$.

Ion species: $^1H^+$
Implantation energy: 3 kV
Implantation amount: $5.5 \times 10^{+14}$ $cm^{-2}$ The result is shown in FIG. 2. The average H atom concentration in the film before the chemical strengthening was 7.9 E+20 atom/cc, that is, $7.9 \times 10^{+20}$ atom/cc.

(4) Chemical Strengthening Process

The glass substrate for chemical strengthening obtained in the above (2) was subjected to a chemical strengthening process with a potassium nitrate molten salt at 435° C. for 4 hours.

(5) Measurement of Surface Stress and Depth of Compressive Stress Layer

The float glass after the chemically strengthening was measured for surface stress mean value (CS; unit, MPa), and the depth of the compressive stress layer (DOL; unit, μm). A surface stress meter (FSM-6000LE, manufactured by Orihara Manufacturing Co., Ltd.) was used for the measurements of the surface stress mean value (CS) and the depth of the compressive stress layer. The results are shown in Table 1.

TABLE 1

| | Thin-film forming method | Film composition | Film thickness (nm) | CS (Mpa) | DOL (μm) | Δ Warpage amount (μm) |
|---|---|---|---|---|---|---|
| Ex. 1 | CVD | $SiO_2$ | 100 | 768 | 43.9 | 1.3 |
| Ref. Ex. 1 | Ref | No film | — | 780 | 47.1 | 23.2 |
| Ex. 2 | Wet coat | $SiO_2$ | 100 | 716 | 44 | Not measured |

As shown in Table 1, the stress values measured on the film-formed surfaces of the chemically strengthened glass substrates for chemical strengthening that had a 100-nm $SiO_2$ film (Examples 1 and 2) were compared with the case of the chemically strengthened glass substrate for chemical strengthening in which a film was not formed (Comparative Example 1), and then, it was found that the similar stress values were given.

It was found from these results that, the film formed of the inorganic material containing H atoms is formed on the glass substrate in the glass substrate for chemical strengthening according to the present invention, and thus, the chemical strengthening process can be performed after the film has been formed on the glass substrate.

It was also found that Δ warpage amount which is a difference in the warpage amount of the glass substrate before and after the chemical strengthening is reduced after the glass for chemical strengthening that contains H atoms in a content of $1.0 \times 10^{15}$ to $1.0 \times 10^{19}$ atom/mm³ in the inorganic material contained in the film formed on the glass substrate surface has been subjected to chemical strengthening, as shown in Table 1. In addition, Δ warpage amount is decreased as the depth of the compressive stress layer decreased.

It was found from these results that, by forming the film formed of the inorganic material containing H atoms on the glass substrate, the depth of the compressive stress layer is made smaller, and the warpage of the glass substrate after the chemical strengthening is reduced.

Although the present invention has been described in detail and by reference to the specific embodiments, it is apparent to one skilled in the art that various modifications or changes can be made without departing the spirit and scope of the present invention. This application is based on Japanese Patent Application No. 2011-277203 filed on Dec. 19, 2011, the content of which is incorporated herein by reference.

REFERENCE SIGNS LIST

1: Center slit
2: Outer slits
4: Channel
5: Discharge slits
10: Injector
20: Glass substrate

The invention claimed is:

1. A glass substrate for chemical strengthening, formed by a float process,
   comprising at least one layer of a film formed of an inorganic material that contains H atoms in a concentration of $1.0\times10^{15}$ to $1.0\times10^{19}$ atom/mm$^3$, the at least one layer being formed on at least one surface of the glass substrate.

2. The glass substrate for chemical strengthening according to claim 1, wherein the inorganic material is an alkali-free oxide.

3. The glass substrate for chemical strengthening according to claim 2, wherein the alkali-free oxide includes at least one of an oxide and a composite oxide, the oxide and composite oxide include at least one element selected from the group consisting of silicon, titanium, tin, aluminum, zinc, chromium, copper, manganese, iron, cobalt, nickel, zirconium, silver, niobium, molybdenum, antimony, and indium.

4. The glass substrate for chemical strengthening according to claim 1, wherein the film formed of the inorganic material is a film formed by an atmospheric pressure CVD method.

5. A glass substrate obtained by subjecting the glass substrate for chemical strengthening according to claim 1 to a chemical strengthening process.

6. A method for producing a glass substrate for chemical strengthening, the method comprising forming at least one layer of a film formed of an inorganic material that contains H atoms in a concentration of $1.0\times10^{15}$ to $1.0\times10^{19}$ atom/mm$^3$ on at least one surface of a glass substrate formed by a float process.

7. The method for producing a glass substrate for chemical strengthening according to claim 6, wherein the film formed of the inorganic material that contains H atoms in a concentration of $1.0\times10^{15}$ to $1.0\times10^{19}$ atom/mm$^3$ is formed by an atmospheric pressure CVD method.

* * * * *